UNITED STATES PATENT OFFICE.

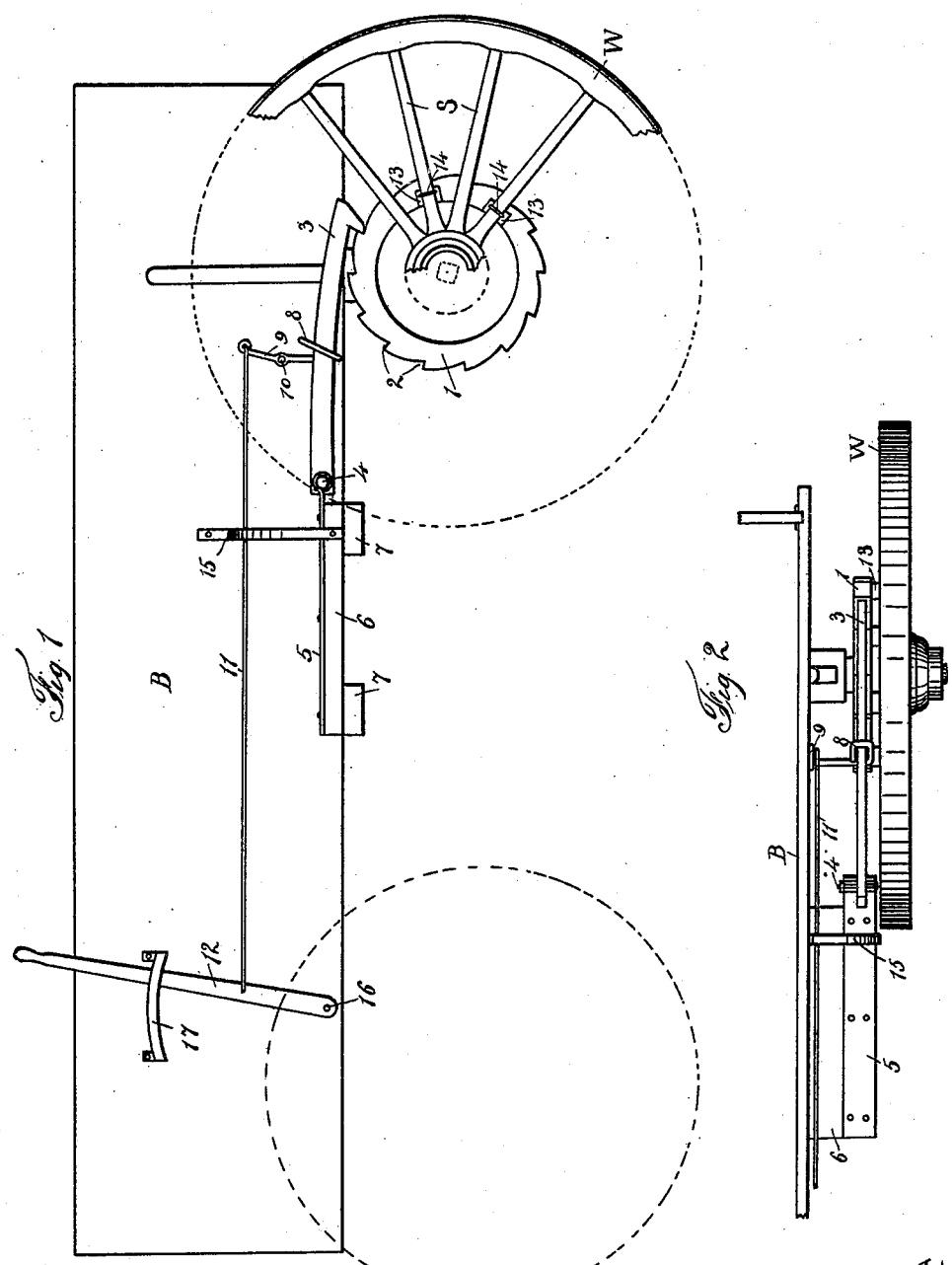

CALVIN S. DOBBINS, OF NORTHBEND, NEBRASKA.

WAGON-LOCK.

SPECIFICATION forming part of Letters Patent No. 690,408, dated January 7, 1902.

Application filed October 16, 1900. Serial No. 33,279. (No model.)

*To all whom it may concern:*

Be it known that I, CALVIN S. DOBBINS, residing at Northbend, in the county of Dodge and State of Nebraska, have invented certain useful Improvements in Wagon-Locks; and I do hereby declare that the following is a full, clear, and exact description of the invention, such as will enable others skilled in the art to which it appertains to make and use the same, reference being had to the accompanying drawings, which form a part of this specification.

This invention relates to a simple device adapted to be used on farm or other wagons carrying loads which are to be halted at suitable points upon an upgrade.

In the accompanying drawings I have shown in Figure 1 a side view, with portions removed, of a wagon embodying my locking device, while Fig. 2 shows a top view with portions broken away.

In the harvesting of corn, especially in hilly sections, it is desirable, especially when a loaded wagon is traveling an upgrade, to halt the same at suitable points, so that the harvest may be thrown into the wagon. In order to take the strain off of the draft-animals and insure the wagon halting at the right place, I provide one of the rear wheels, as the one marked W in Fig. 1, with a rack-plate 1, having a plurality of teeth 2, the plate 1 being secured by means of suitable staples 14, which are secured to plates 13, which plates in turn are fastened to the rack-plate 1. Any screw or bolt, however, may be used to secure the rack-plate 1 to the spokes of the wagon-wheel. At a suitable point I provide the wagon with a plate 5, from which extends pivotally a dog 3, the nosing of which is adapted to ride into the serrations of the rack-plate 1. This rack-plate, it will be noticed, is so positioned that the wheels will freely revolve forward, the dog riding over the rack-plate, but locking the plate as soon as the wagon is backed. At a suitable point I provide an ordinary lever 9, the lower end 8 of which supports the dog 3, the lever being secured by means of a pin 10. At the forward end, near the seat, I provide a lever 12, pivoted by means of the pin 16 and secured by means of a bar 17, so arranged that when this lever 12 is thrown forward it throws the lever 9 upward, being connected by means of the rod 11 to disengage the dog 3 from the rack-plate 1.

The device is exceedingly simple and can be secured to any coal or other wagon intended to carry heavy loads.

Having thus described my said invention, what I claim as new, and desire to secure by United States Letters Patent, is—

The combination with a wagon, of the circular rack-plate 1, secured to one of the rear wheels of said wagon, of the suitable staples 14 encompassing suitable spokes to said rear wheel to secure said rack-plate to said rear wheel, of the plate 5 secured to the side of the wagon, of the dog 3, pivotally secured to said plate 5, said dog being provided with a nosing adapted to engage said rack-plate, the lever 9, pivotally secured to the side of the wagon, the lower recurved end 8, of said lever 9, holding and supporting said dog 3, the pin 10 securing said lever 9, of the operating-lever 12 pivotally secured to the side of the wagon, and the connecting-bar 11, securing lever 12 to said lever 9, said instrumentalities being arranged substantially as shown.

CALVIN S. DOBBINS.

In presence of—
  J. N. NEWELL,
  HENRY W. HELMER.